United States Patent
Shimizu

(10) Patent No.: US 11,768,287 B2
(45) Date of Patent: Sep. 26, 2023

(54) OBJECT DETECTION APPARATUS

(71) Applicant: DENSO CORPORATION, Kariya (JP)

(72) Inventor: Naotsugu Shimizu, Kariya (JP)

(73) Assignee: DENSO CORPORATION, Kariya (JP)

( * ) Notice: Subject to any disclaimer, the term of this patent is extended or adjusted under 35 U.S.C. 154(b) by 297 days.

(21) Appl. No.: 17/179,207

(22) Filed: Feb. 18, 2021

(65) Prior Publication Data

US 2021/0173078 A1    Jun. 10, 2021

Related U.S. Application Data

(63) Continuation of application No. PCT/JP2019/032277, filed on Aug. 19, 2019.

(30) Foreign Application Priority Data

Aug. 22, 2018   (JP) .................................. 2018-155415

(51) Int. Cl.
*G01S 13/931*    (2020.01)
*G01S 13/04*    (2006.01)

(52) U.S. Cl.
CPC ............ *G01S 13/931* (2013.01); *G01S 13/04* (2013.01); *G01S 2013/93272* (2020.01)

(58) Field of Classification Search
CPC ........ G01S 13/04; G01S 13/87; G01S 13/931; G01S 2013/93272
See application file for complete search history.

(56) References Cited

U.S. PATENT DOCUMENTS

| | | | |
|---|---|---|---|
| 5,661,666 A * | 8/1997 | Pawlak ................ | G06V 10/255 702/182 |
| 10,762,440 B1* | 9/2020 | Garg .................... | G01S 13/867 |
| 2003/0083818 A1* | 5/2003 | Tojima .................... | G01S 13/87 342/70 |
| 2004/0252047 A1* | 12/2004 | Miyake ................ | G01S 13/931 342/107 |
| 2007/0171122 A1 | 7/2007 | Nakano et al. | |
| 2011/0050484 A1 | 3/2011 | Malamosjo | |

(Continued)

FOREIGN PATENT DOCUMENTS

| | | |
|---|---|---|
| JP | 06-308225 A | 11/1994 |
| JP | 11-271427 A | 10/1999 |

(Continued)

*Primary Examiner* — Peter M Bythrow
(74) *Attorney, Agent, or Firm* — MASCHOFF BRENNAN

(57) ABSTRACT

An object detection apparatus is configured to be mounted to a vehicle to detect objects existing around the vehicle. The object detection apparatus includes an output acquisition unit, an accuracy estimation unit, a weighting setting unit and a position calculation unit. The output acquisition unit is configured to acquire output signals from a plurality of radar sensors mounted respectively at different positions in the vehicle. The accuracy estimation unit is configured to estimate, based on the output signals from the radar sensors, detection accuracies of the radar sensors. The weighting setting unit is configured to set, according to the detection accuracies of the radar sensors, weighting for the output signals from the radar sensors. The position calculation unit is configured to calculate a position of an object by using in combination the output signals from the radar sensors reflecting the set weighting.

15 Claims, 11 Drawing Sheets

(56) References Cited

U.S. PATENT DOCUMENTS

| | | | |
|---|---|---|---|
| 2011/0291874 A1* | 12/2011 | De Mersseman | G01S 13/87 342/70 |
| 2013/0021196 A1* | 1/2013 | Himmelstoss | G01S 7/023 342/159 |
| 2014/0118186 A1* | 5/2014 | Nakanishi | G01S 13/42 342/128 |
| 2015/0070204 A1 | 3/2015 | Shirakawa | |
| 2015/0198697 A1* | 7/2015 | Kishigami | G01S 7/2923 342/145 |
| 2015/0247924 A1* | 9/2015 | Kishigami | G01S 7/411 342/146 |
| 2016/0320481 A1* | 11/2016 | Ling | G01S 13/87 |
| 2017/0299397 A1* | 10/2017 | Ichikawa | G01C 21/34 |
| 2017/0363720 A1* | 12/2017 | Moriuchi | G01S 13/536 |
| 2017/0363737 A1* | 12/2017 | Kaino | G01S 13/345 |
| 2017/0363738 A1* | 12/2017 | Kaino | G01S 13/584 |
| 2018/0313935 A1* | 11/2018 | Fujitsu | G01S 13/42 |
| 2019/0004175 A1* | 1/2019 | Kato | G01S 13/345 |
| 2019/0079179 A1* | 3/2019 | Kitamura | G01S 13/34 |
| 2020/0025575 A1* | 1/2020 | Weissman | G01S 17/06 |
| 2020/0247403 A1* | 8/2020 | Beuth | G01S 13/86 |
| 2021/0003687 A1* | 1/2021 | Nishida | G01S 13/06 |

FOREIGN PATENT DOCUMENTS

| | | | |
|---|---|---|---|
| JP | 2000-284049 A | 10/2000 | |
| JP | 2006-090957 A | 4/2006 | |
| JP | 2008-111773 A | 5/2006 | |
| JP | 2007225602 A | 9/2007 | |
| JP | 2009-041981 A | 2/2009 | |
| WO | 2018235818 A1 | 12/2018 | |

* cited by examiner

FIG.10

|  |  | RIGHT RADAR APPARATUS | |
|---|---|---|---|
|  |  | NORMAL | MULTIPATH PROPAGATION (S/N RATIOS LOWERED) |
| LEFT RADAR APPARATUS | NORMAL | LEFT-RIGHT AVERAGE | LEFT-RIGHT WEIGHTED AVERAGE |
| | MULTIPATH PROPAGATION (S/N RATIOS LOWERED) | LEFT-RIGHT WEIGHTED AVERAGE | LEFT-RIGHT AVERAGE |

FIG.11

| S/N RATIO DROP DETERMINATION RESULTS | | WEIGHTS (W) |
|---|---|---|
| S/N RATIOS NOT LOWERED | | 1 |
| S/N RATIOS LOWERED (LOWER THAN PEAK HOLD VALUE OF ELECTRIC POWER BY GIVEN VALUE OR MORE) | ELECTRIC POWER NOT LOWER THAN SET VALUE (NOISE + $\alpha$) | SET WEIGHTS ACCORDING TO S/N RATIOS (APPROACH 0 WITH DECREASE IN S/N RATIOS) |
| | ELECTRIC POWER LOWER THAN SET VALUE (NOISE + $\alpha$) | 0 |

FIG.12

|  |  | FMCW ||
|---|---|---|---|
|  |  | NORMAL | AZIMUTH ACCURACY DETERIORATED |
| 2FCW | NORMAL | AVERAGE OF FMCW AND 2FCW | 2FCW |
|  | AZIMUTH ACCURACY DETERIORATED | FMCW | WEIGHTED AVERAGE OF LEFT AND RIGHT RADAR APPARATUSES |

FIG.13

| AZIMUTH ACCURACY DETERIORATION DETERMINATION RESULTS || WEIGHTS (W) |
|---|---|---|
| AZIMUTH ACCURACY NOT DETERIORATED || 1 |
| AZIMUTH ACCURACY DETERIORATED | ELECTRIC POWER OF ROADSIDE OBJECT NOT HIGHER THAN SET VALUE | SET WEIGHTS ACCORDING TO ROADSIDE-OBJECT ELECTRIC POWER (APPROACH 0 WITH INCREASE IN ROADSIDE-OBJECT ELECTRIC POWER) |
|  | ELECTRIC POWER OF ROADSIDE OBJECT HIGHER THAN SET VALUE | 0 |

FIG.14

|  |  | RIGHT RADAR APPARATUS ||
|---|---|---|---|
|  |  | NORMAL | INTERFERENCE |
| LEFT RADAR APPARATUS | NORMAL | LEFT-RIGHT AVERAGE | LEFT-RIGHT WEIGHTED AVERAGE |
|  | INTERFERENCE | LEFT-RIGHT WEIGHTED AVERAGE | LEFT-RIGHT AVERAGE |

FIG.15

| INTERFERENCE DETERMINATION RESULTS | | WEIGHTS (W) |
|---|---|---|
| INTERFERENCE NOT OCCURRED | | 1 |
| INTERFERENCE OCCURRED | NOISE FLOOR NOT HIGHER THAN SET VALUE (DEFAULT NOISE + $\alpha$) | SET WEIGHTS ACCORDING TO AMOUNT OF INCREASE IN NOISE (APPROACH 0 WITH INCREASE IN NOISE) |
| | NOISE FLOOR HIGHER THAN SET VALUE (DEFAULT NOISE + $\alpha$) | 0 |

OBJECT DETECTION APPARATUS

CROSS-REFERENCE TO RELATED APPLICATIONS

The present application is a continuation application of International Application No. PCT/JP2019/032277 filed on Aug. 19, 2019, which is based on and claims priority from Japanese Patent Application No. 2018-155415 filed on Aug. 22, 2018. The contents of these applications are hereby incorporated by reference in their entirety into the present application.

BACKGROUND

1 Technical Field

The present disclosure relates to object detection apparatuses that are configured to detect objects existing around a vehicle.

2 Description of Related Art

There are known object detection apparatuses that use a plurality of modulation methods in combination so as to improve the accuracy of detecting objects.

SUMMARY

According to the present disclosure, there is provided an object detection apparatus that is configured to be mounted to a vehicle to detect objects existing around the vehicle. The object detection apparatus includes an output acquisition unit, an accuracy estimation unit, a weighting setting unit and a position calculation unit. The output acquisition unit is configured to acquire output signals from a plurality of radar sensors mounted respectively at different positions in the vehicle. The accuracy estimation unit is configured to estimate, based on the output signals from the radar sensors, detection accuracies of the radar sensors. The weighting setting unit is configured to set, according to the detection accuracies of the radar sensors, weighting for the output signals from the radar sensors. The position calculation unit is configured to calculate a position of an object by using in combination the output signals from the radar sensors reflecting the set weighting.

BRIEF DESCRIPTION OF THE DRAWINGS

FIG. 10 is a table illustrating examples of combining output signals from the left and right radar apparatuses depending on whether multipath propagation has occurred.

FIG. 11 is a table illustrating examples of setting weighting depending on whether multipath propagation has occurred.

FIG. 12 is a table illustrating examples of combining output signals, which are generated by respective modulation methods, according to azimuth accuracy estimation results.

FIG. 13 is a table illustrating examples of setting weighting according to the azimuth accuracy estimation results.

FIG. 14 is a table illustrating examples of combining the output signals from the left and right radar apparatuses depending on whether interference has occurred.

FIG. 15 is a table illustrating examples of setting weighting depending on whether interference has occurred.

DESCRIPTION OF EMBODIMENTS

There is disclosed, for example in Japanese Patent Application Publication No. JP 2004-340755 A, a vehicular radar apparatus that transmits two radar waves in combination. One of the two radar waves is modulated by an FMCW modulation method; the other of the two radar waves is modulated by a CW modulation method. Moreover, the vehicular radar apparatus determines the validity of detection results by the FMCW modulation method using detection results by the CW modulation method. If the detection results by the FMCW modulation method are determined to be valid, the vehicular radar apparatus uses an azimuth detected by the FMCW modulation method. Otherwise, if the detection results by the FMCW modulation method are determined to be invalid, the vehicular radar apparatus uses an azimuth detected by the CW modulation method.

However, as a result of detailed investigation by the inventor of the present application, it has been found that with the technique of the above patent document, the detection accuracy may be deteriorated in all the detections by the two modulation methods under the influence of external factors; the external factors include, for example, radar waves that are transmitted from another vehicle, which exists in the vicinity of the vehicular radar apparatus and is equipped with an object detection apparatus of the same type as the vehicular radar apparatus, and interfere with the radar waves transmitted by the vehicular radar apparatus. In this case, the object detection capability of the vehicular radar apparatus would be lowered.

In contrast, in the above-described object detection apparatus according to the present disclosure, the output signals from the radar sensors, which are arranged respectively at different positions in the vehicle, are used in combination. Therefore, even when the detection accuracy of one of the radar sensors is deteriorated, it is still possible to reliably detect the object if the detection accuracy of the other radar sensor(s) is not deteriorated. Moreover, even when the detection accuracies of the radar sensors are all deteriorated, since the positions of the radar sensors are different from each other, it is easy for a difference to be caused between the detection accuracies. Therefore, using in combination the output signals from the radar sensors reflecting the weighting that is set according to the detection accuracies of the radar sensors, it is possible to detect the object with a greater weight given to the output signal from one of the radar sensors which has higher detection accuracy than the other radar sensor(s). Consequently, it becomes possible to suppress the influence of external factors such as radar waves transmitted from other vehicles; thus it becomes easier to detect the object than in the case of using only the output signals from a single radar sensor.

1. EMBODIMENT

[1-1. Configuration]

An exemplary embodiment will be described hereinafter with reference to the drawings.

Figure 1:
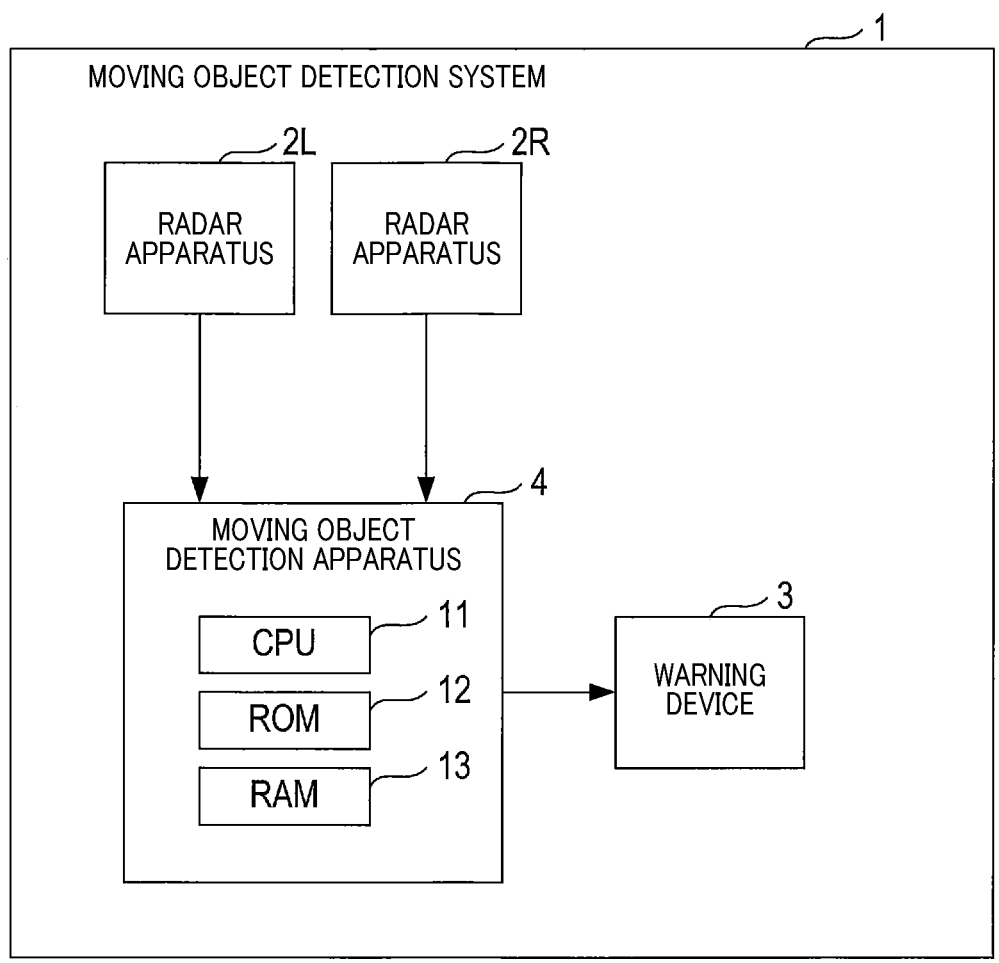
FIG. 1 is a block diagram illustrating the configuration of a moving object detection system.

A moving object detection system 1 according to the present embodiment is a system which is mounted to a vehicle and configured to detect objects existing around the vehicle. As shown in FIG. 1, the moving object detection system 1 includes two radar apparatuses 2L and 2R, a warning device 3, and a moving object detection apparatus 4.

The radar apparatus 2L is a left radar apparatus which is installed on a rear left side surface of the vehicle. On the other hand, the radar apparatus 2R is a right radar apparatus which is installed on a rear right side surface of the vehicle. The configurations and functions of the two radar apparatuses 2L and 2R are basically the same. Hereinafter, the two radar apparatuses 2L and 2R will also be collectively referred to as the radar apparatuses 2. In addition, it is essential for the moving object detection system 1 to include at least one radar apparatus; the moving object detection system 1 may include three or more radar apparatuses.

The radar apparatuses 2 are millimeter-wave radars that repeatedly transmit and receive radar waves to monitor the surroundings of the vehicle VH. In the present embodiment, transmission signals modulated by a plurality of modulation methods, more particularly, a transmission signal modulated by an FMCW method and a transmission signal modulated by a 2FCW method are combined into one set. The radar apparatuses 2 repeatedly transmit, in a predetermined cycle, radar waves that are modulated by the plurality of modulation methods, more particularly, are based on the one set of the transmission signals. In addition, FMCW is an abbreviation for Frequency Modulated Continuous Wave; 2FCW is an abbreviation for 2-Frequency Continuous wave.

Figure 2:
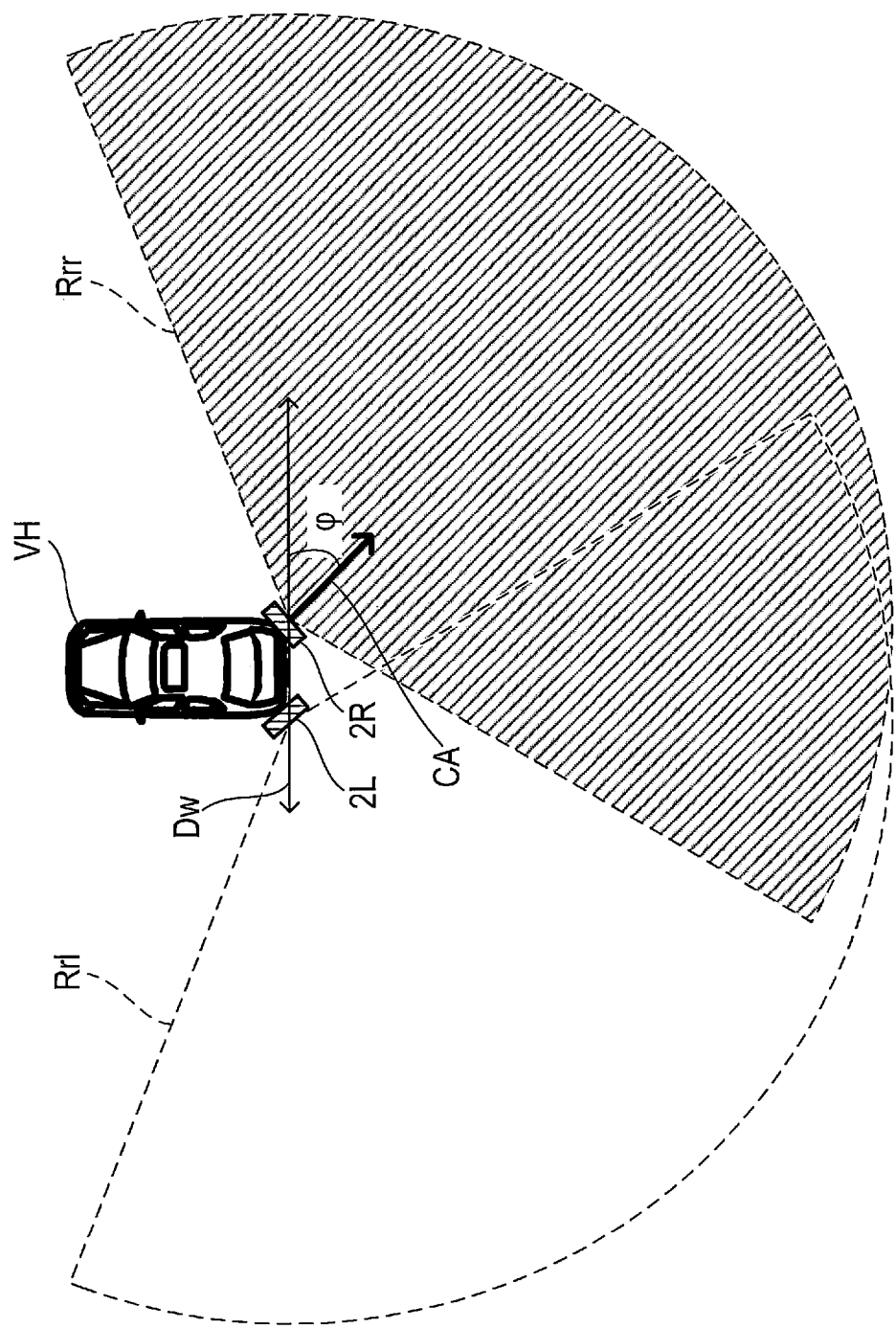
FIG. 2 is a diagram illustrating the installation positions of radar apparatuses and object detection regions.

As shown in FIG. 2, the radar apparatuses 2 are installed respectively in left-rear and right-rear parts of the vehicle VH that is equipped with the moving object detection system 1. The radar apparatuses 2 detect objects existing in object detection regions, which include moving objects (e.g., other vehicles such as automobiles and motorcycles) and roadside objects (e.g., stationary objects existing around the vehicle, such as guard rails and trees), by transmitting radar waves respectively to the left and right sides behind the vehicle VH.

In addition, in FIG. 2, the object detection region Rrr of the right radar apparatus 2R is depicted as a hatched area on a horizontal plane. The right radar apparatus 2R is installed such that a central axis CA of a detection range of a receiving antenna is oriented in a direction inclined by an installation angle φ backward with respect to a width direction DW of the vehicle VH. The detection range is set to include, for example, a range of ±80° centering on the central axis CA on the horizontal plane.

Moreover, the left radar apparatus 2L is configured similarly to the right radar apparatus 2R. As shown in FIG. 2, the object detection region Rrl of the left radar apparatus 2L is set so as to: partially overlap the object detection region Rrr of the right radar apparatus 2R; and be line-symmetrical with the object detection region Rrr of the right radar apparatus 2R with respect to the center line in the left-right direction of the vehicle.

The radar apparatuses 2 function both as a transmitter to transmit transmission waves based on the predetermined transmission signals and as a radar sensor to receive, as reception waves, reflected waves returning from objects by which the transmission waves are reflected. Mover, the radar apparatuses 2 convert the reception waves, which are in analog waveforms, into digital signals and send the reception waves converted into the digital signals, i.e., AD waveforms to the moving object detection apparatus 4.

The warning device 3 is a well-known device which issues a warning upon receipt of a command from the moving object detection apparatus 4 when the moving object detection apparatus 4 has detected a moving object approaching behind the vehicle. The warning device 3 includes, for example, an audio output device installed in the vehicle compartment and outputs a warning sound to occupants of the vehicle.

As shown in FIG. 1, the moving object detection apparatus 4 is an electronic control apparatus which is configured mainly with a microcomputer of a well-known type; the microcomputer includes a CPU 11, a ROM 12 and a RAM 13. Various functions of the microcomputer are realized by execution of programs by the CPU 11; the programs are stored in a non-transitory tangible storage medium. In this example, the ROM 12 is the non-transitory tangible storage medium in which the programs are stored. Moreover, methods corresponding to the programs are also realized by execution of the programs.

In addition, non-transitory tangible storage media denote storage media excluding electromagnetic waves. Moreover, some or all of the functions performed by the CPU 11 may alternatively be realized by hardware such as one or more ICs. Furthermore, the moving object detection apparatus 4 may be configured with either a single microcomputer or a plurality of microcomputers.

[1-2. Process]

Next, an object detection process performed by the moving object detection apparatus 4 will be described with reference to the flow chart of FIG. 3. The object detection process is, for example, a process which is started upon a power supply of the moving object detection system 1 being turned on, and is then repeatedly performed in a predetermined cycle such as every 30 ms.

Figure 3:
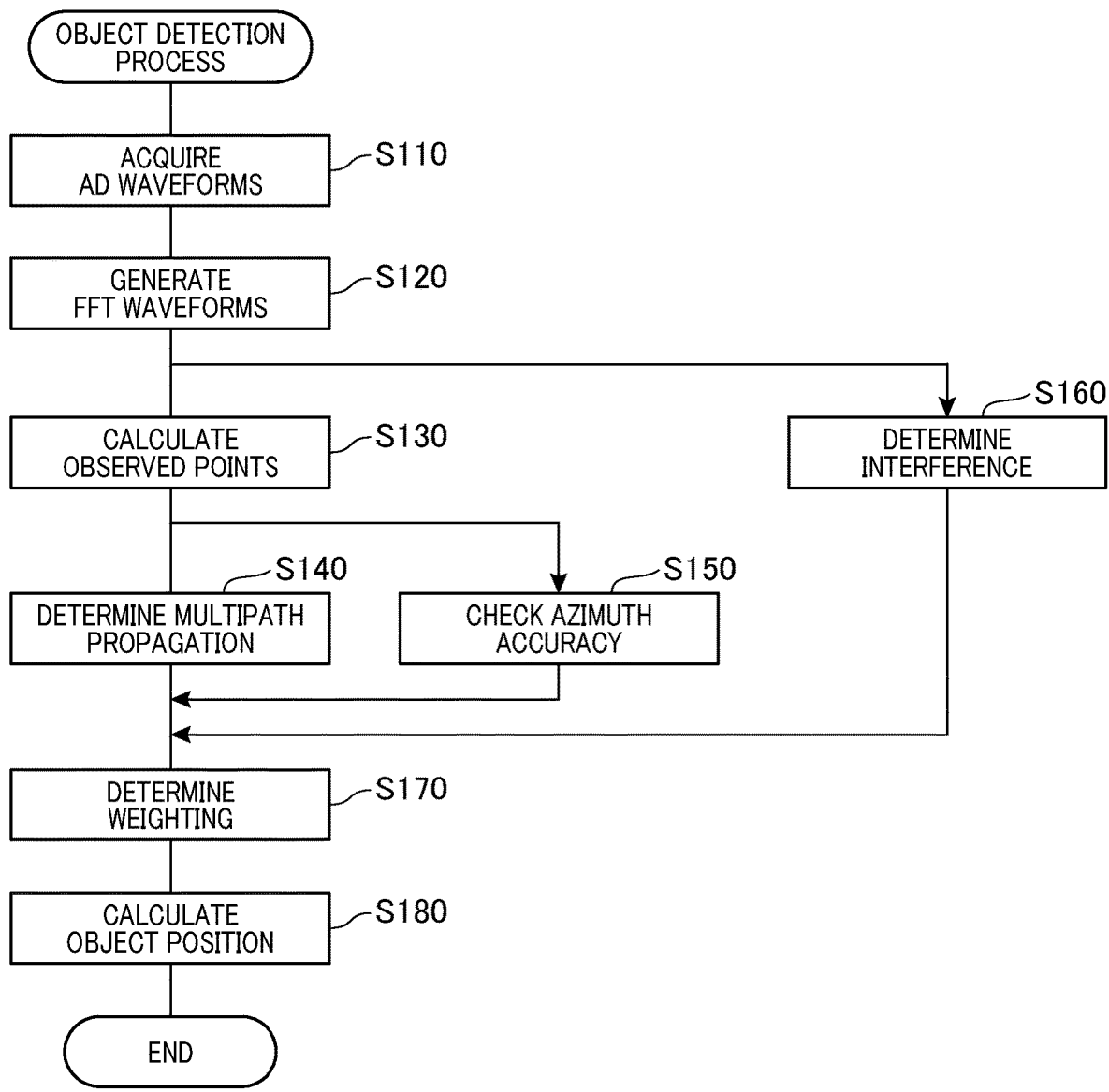
FIG. 3 is a flow chart illustrating an object detection process.
Figure 4:
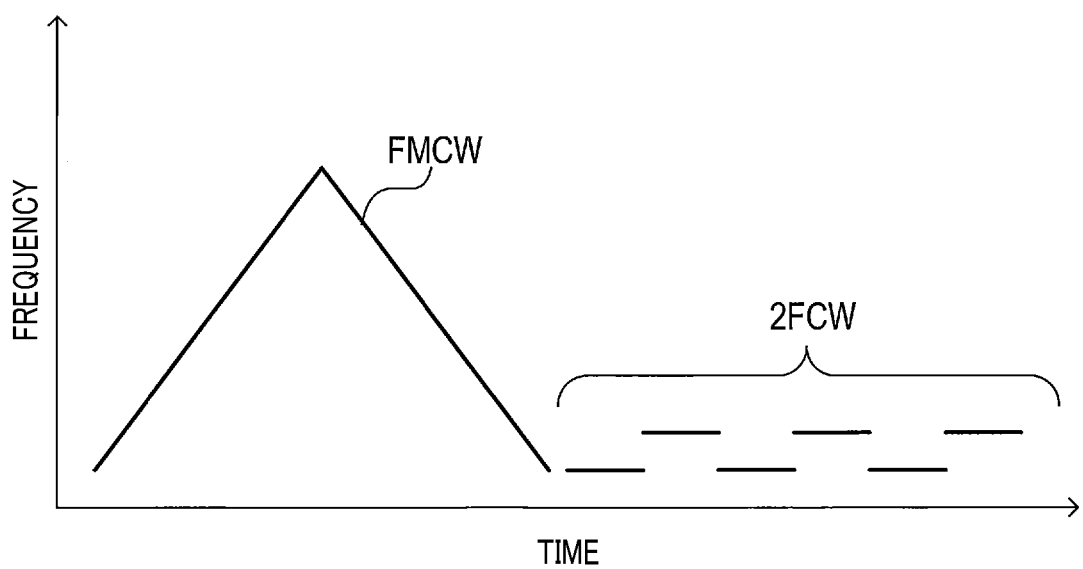
FIG. 4 is a diagram showing the waveforms of radar waves transmitted from the radar apparatuses.

In the object detection process, as shown in FIG. 3, first, in step S110, the moving object detection apparatus 4 acquires the AD waveforms from the radar apparatuses 2. In addition, as shown in FIG. 4, in the present embodiment, each radar apparatus 2 transmits, for example in a 30 ms cycle, a set of transmission signals and receives the reflected waves; the set of transmission signals is a combination of a transmission signal modulated by the FMCW method and a transmission signal modulated by the 2FCW method. The moving object detection apparatus 4 repeatedly acquires the AD waveforms related to the reflected waves.

For the transmission signal modulated by the FMCW method which is included in one set of the transmission signals, each radar apparatus 2 first raises the frequency of the transmission wave with time from a predetermined frequency and then lowers the frequency of the transmission wave with time to the predetermined frequency. Moreover, for the transmission signal modulated by the 2FCW method which is also included in the one set of the transmission signals, each radar apparatus 2 intermittently repeats transmission of the transmission wave at two frequencies a plurality of times after the transmission of the transmission wave by the FMCW method. In the present embodiment, each radar apparatus 2 transmits the transmission waves three times, i.e., transmits three sets of the transmission signals.

In addition, in the present embodiment, the AD waveforms are generated by the radar apparatuses 2L and 2R. However, the present disclosure is not limited to this configuration. As an alternative, the AD waveforms may be generated by the object detection apparatus 4. In the case of the AD waveforms being generated by the object detection apparatus 4, the object detection apparatus 4 may acquire the reception waves in the analog waveforms from the radar apparatuses 2 and convert the reception waves into the digital signals.

Next, in step S120, the moving object detection apparatus 4 generates FFT waveforms. The FFT waveforms are waveforms which are obtained by performing a fast Fourier transform on the AD waveforms. Then, in step S130, the moving object detection apparatus 4 calculates observed points.

The processes of steps S120 and S130 are performed, for example, as follows. The moving object detection apparatus 4 generates beat signals from the AD waveforms; each of the beat signals is a frequency-difference signal whose frequency is equal to the difference in frequency between a corresponding pair of the transmission and reception signals.

Further, the moving object detection apparatus 4 performs a frequency analysis process by FFT on the generated beat signals, thereby generating frequency spectra as the FFT waveforms. More specifically, the moving object detection apparatus 4 generates, for each of the modulation methods, frequency spectra from the beat signals generated by the modulation method. The frequency spectra are data indicative of the relationship between each frequency component of the output signals from the radar apparatuses 2 and the signal strength corresponding to the each frequency component. In addition, the signal strength is expressed by the received electric power; hereinafter, the signal strength will also be referred to as the electric power.

In the present embodiment, the radar apparatuses 2 detect objects by the well-known FMCW method. The moving object detection apparatus 4 generates, for each antenna, a frequency spectrum Sp_up from the beat signal corresponding to a frequency-rising part of the transmission signal modulated by the FMCW method and a frequency spectrum Sp_dn from the beat signal corresponding to a frequency-falling part of the transmission signal modulated by the FMCW method. Then, the moving object detection apparatus 4 extracts, for each peak of the frequency spectra Sp_up and Sp_dn, both an azimuth θ and the electric power information.

Specifically, the moving object detection apparatus 4 performs, for N peak frequency components of the same frequency collected from a plurality of antennas provided in the radar apparatuses 2, an arrival-direction estimation process using an algorithm such as Multiple Signal Classification (hereinafter, to be referred to as MUSIC), thereby extracting an azimuth θ. Then, the moving object detection apparatus 4 pair-matches, using the extracted azimuth θ and the electric power information, the peak frequency of the frequency spectrum Sp_up and the peak frequency of the frequency spectrum Sp_dn which correspond to the same object. Thereafter, based on the pair-matched peak frequencies of the frequency spectra Sp_up and Sp_dn, the moving object detection apparatus 4 calculates, for each object, both the relative velocity Vr of the object to the vehicle VH and the distance R from the vehicle VH to the object.

Moreover, the radar apparatuses 2 detect objects also by the well-known 2FCW method. The moving object detection apparatus 4 generates two frequency spectra from the beat signals respectively corresponding to the two transmission frequencies. Then, the moving object detection apparatus 4 generates a frequency spectrum Sp_cw by adding the two generated frequency spectra together.

The moving object detection apparatus 4 extracts, for each peak of the frequency spectrum Sp_cw, both an azimuth θ and the electric power information. The azimuth θ may be obtained by performing an arrival-direction estimation process using an algorithm such as MUSIC. Then, the moving object detection apparatus 4 calculates, using the extracted azimuth θ and the electric power information, both the relative velocity Vr of an object to the vehicle VH and the distance R from the vehicle VH to the object on the basis of the peak frequency of the frequency spectrum Sp_cw.

Moreover, the moving object detection apparatus 4 generates object information based on the frequency spectra, and outputs the generated object information to the moving object detection apparatus 4. In addition, the object information includes the positions P of the observed points for objects, which are calculated based on the distances R and azimuths θ of the objects, and the relative velocities of the objects.

The moving object detection apparatus 4 is configured to estimate, in steps S140, S150 and S160, the detection accuracies of the radar apparatuses 2 based on the output signals from the radar apparatuses 2. The detection accuracies of the radar apparatuses 2 indicate, for example, whether or not the detection by the radar apparatuses 2 is performed normally, or the certainty of the detection. Here, the detection accuracies of the radar apparatuses 2 are determined by comparing values based on the output signals from the radar apparatuses 2 with preset reference values. In addition, the detection accuracies are determined for each of the modulation methods.

Each of a multipath-propagation determination process, an azimuth-accuracy checking process and an interference determination process is performed as a process of estimating the detection accuracies of the radar apparatuses 2.

In step S140, the moving object detection apparatus 4 makes the multipath-propagation determination. The multipath-propagation determination denotes a determination as to whether a phenomenon where the radar waves are reflected by a road surface, a wall surface and the like and thus the reflected waves from the same object are detected via a plurality of paths, namely multipath propagation, has occurred. It is known that the S/N ratios of the reflected waves tend to be lowered upon occurrence of multipath propagation. Therefore, it is possible to: determine, by any method, whether the S/N ratios of the reflected waves are lower than a preset reference value; and determine, if the S/N ratios are lower than the reference value, that multipath propagation has occurred.

In addition, the S/N ratios of the reflected waves denote the ratios of the signals included in the reflected waves to noise included in the reflected waves. The multipath-propagation determination is performed for each of the modulation methods with respect to each of the left and right radar apparatuses 2L and 2R.

Specifically, the following method may be used for the multipath-propagation determination.

Figure 5:
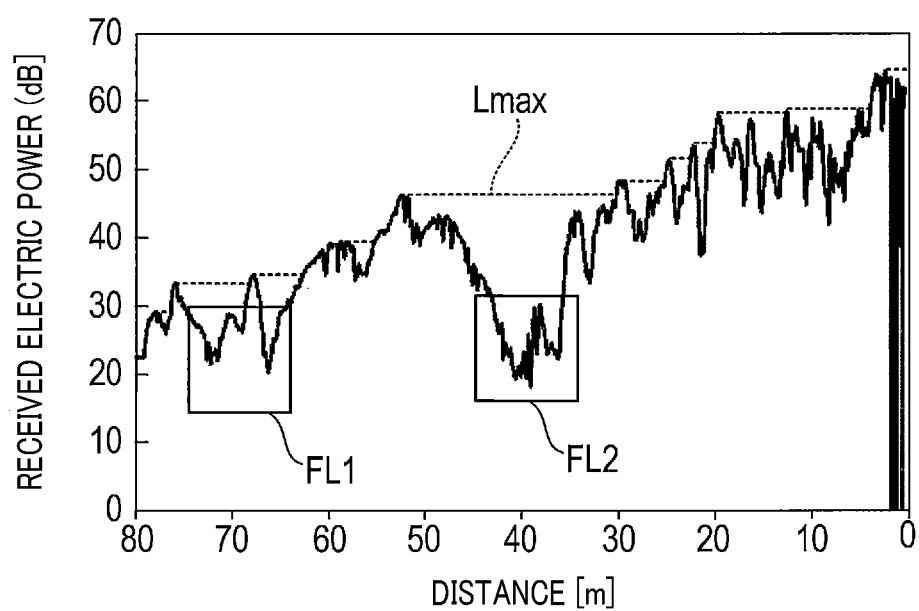
FIG. 5 is a diagram illustrating locations where the S/N ratio is lowered by multipath propagation.

FIG. 5 is a graph illustrating an example of the relationship between the distance from a radar apparatus 2 to an object and the received electric power. The line Lmax depicted as a dashed line in FIG. 5 represents a peak hold value of the received electric power, i.e., a maximum received-electric-power Pmax due to a reflected wave from the object on the far side. Moreover, those areas which are enclosed by rectangular frames FL1 and FL2 represent locations where the S/N ratio is lowered by multipath propagation.

In the multipath-propagation determination, it is determined whether a difference value (hereinafter, to be referred to as the received-electric-power difference) obtained by subtracting the received electric power from the maximum received-electric-power Pmax is greater than a preset drop determination value. In addition, the drop determination value is preset by referring to a drop determination value map.

The drop determination value map is set to have a negative correlation between the distance R indicated by the object information and the drop determination value. It should be noted that the expression of "having a negative correlation between the distance and the drop determination value" denotes that the drop determination value decreases with increase in the distance, and encompasses both the case of the drop determination value decreasing in steps with increase in the distance and the case of the drop determination value decreasing continuously with increase in the distance. When the received-electric-power difference is greater than the drop determination value, it is determined that multipath propagation has occurred and thus the detection accuracy is low.

Next, in step S150, the moving object detection apparatus 4 performs the azimuth-accuracy checking. In addition, the azimuth-accuracy checking process may be performed either in parallel with the process of step S140 as shown in FIG. 3, or in series with the other processes after the process of step S120 until the process of step S170. The azimuth-accuracy checking denotes a determination as to whether the environment of the vehicle equipped with the moving object detection system 1 is a complex environment that lowers the accuracy of calculating the azimuth θ of an object included in the object information.

It is possible to: acquire the environment of the vehicle equipped with the moving object detection system 1; and determine, if the environment satisfies a preset condition for being a complex environment, that the azimuth calculation accuracy is lowered.

Specifically, the following method may be used for the azimuth-accuracy checking.

First, based on the degrees of randomness of the frequency spectra Sp_up, Sp_dn and Sp_cw, for each of the FMCW method and the 2FCW method, it is determined whether the surrounding environment of the vehicle equipped with the moving object detection system 1 is a complex environment that lowers the accuracy of calculating the azimuth θ of an object. Specifically, in the case of the FMCW method, when at least one of the following conditions (A) and (B) is satisfied, it is determined that the surrounding environment of the vehicle VH is a complex environment.

The condition (A): in a complex-environment determination range, the number of peaks of the frequency spectrum Sp_up or the frequency spectrum Sp_dn is larger than a preset threshold number. In addition, the number of peaks denotes the number of local maximum values of the electric power in the frequency spectrum. The condition (B): in the complex-environment determination range, the average value of the peak electric powers, which is obtained by averaging the electric powers at the peaks in the frequency spectrum Sp_up or the frequency spectrum Sp_dn, is higher than a preset peak-value threshold. For example, in the case of the number of peaks being three, the average value of the peak electric powers may be obtained by averaging the electric powers respectively at the three peaks.

Figure 6:
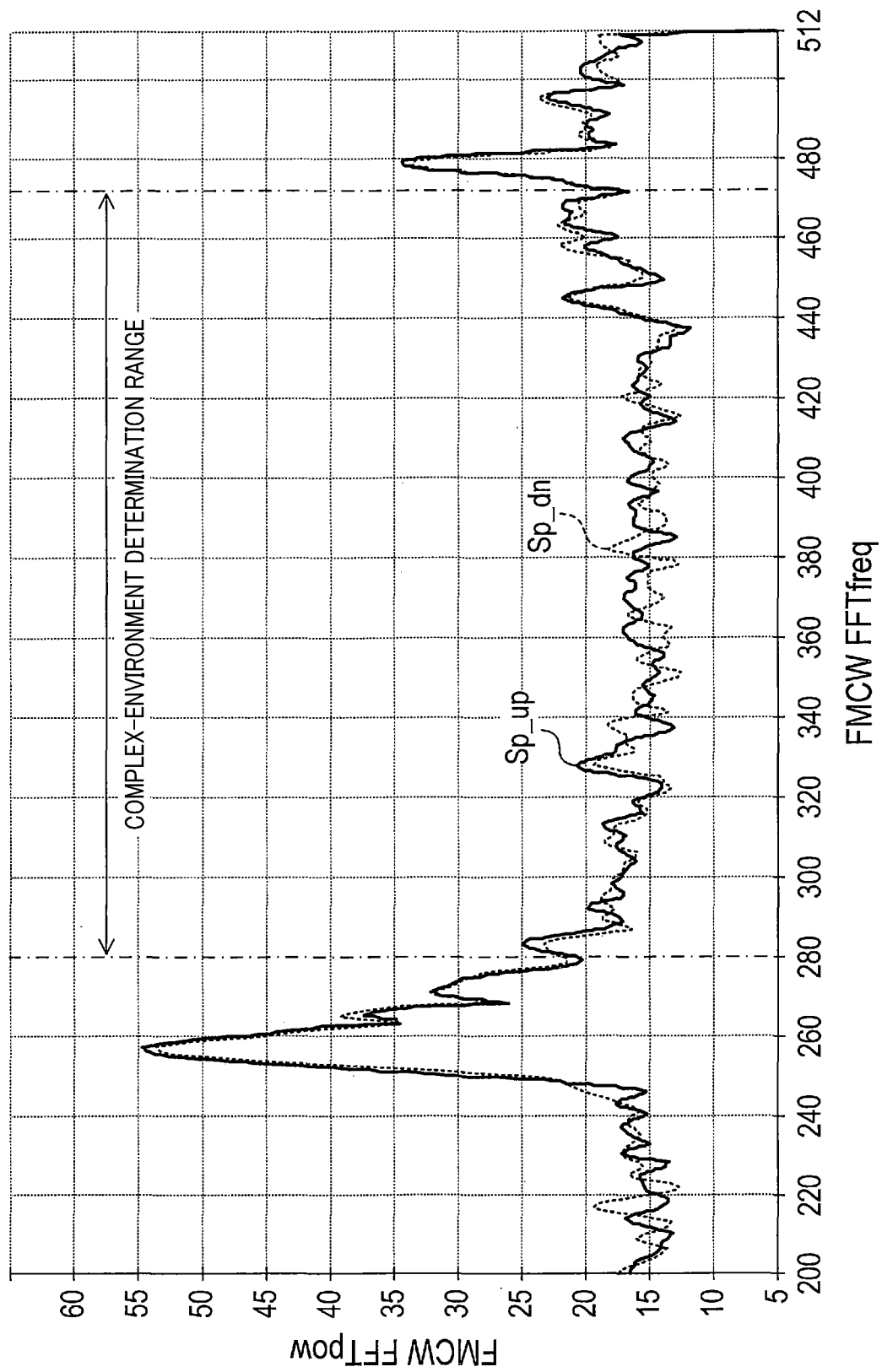
FIG. 6 is a diagram showing the waveform of a frequency spectrum generated by an FMCW method in a clear environment.
Figure 7:
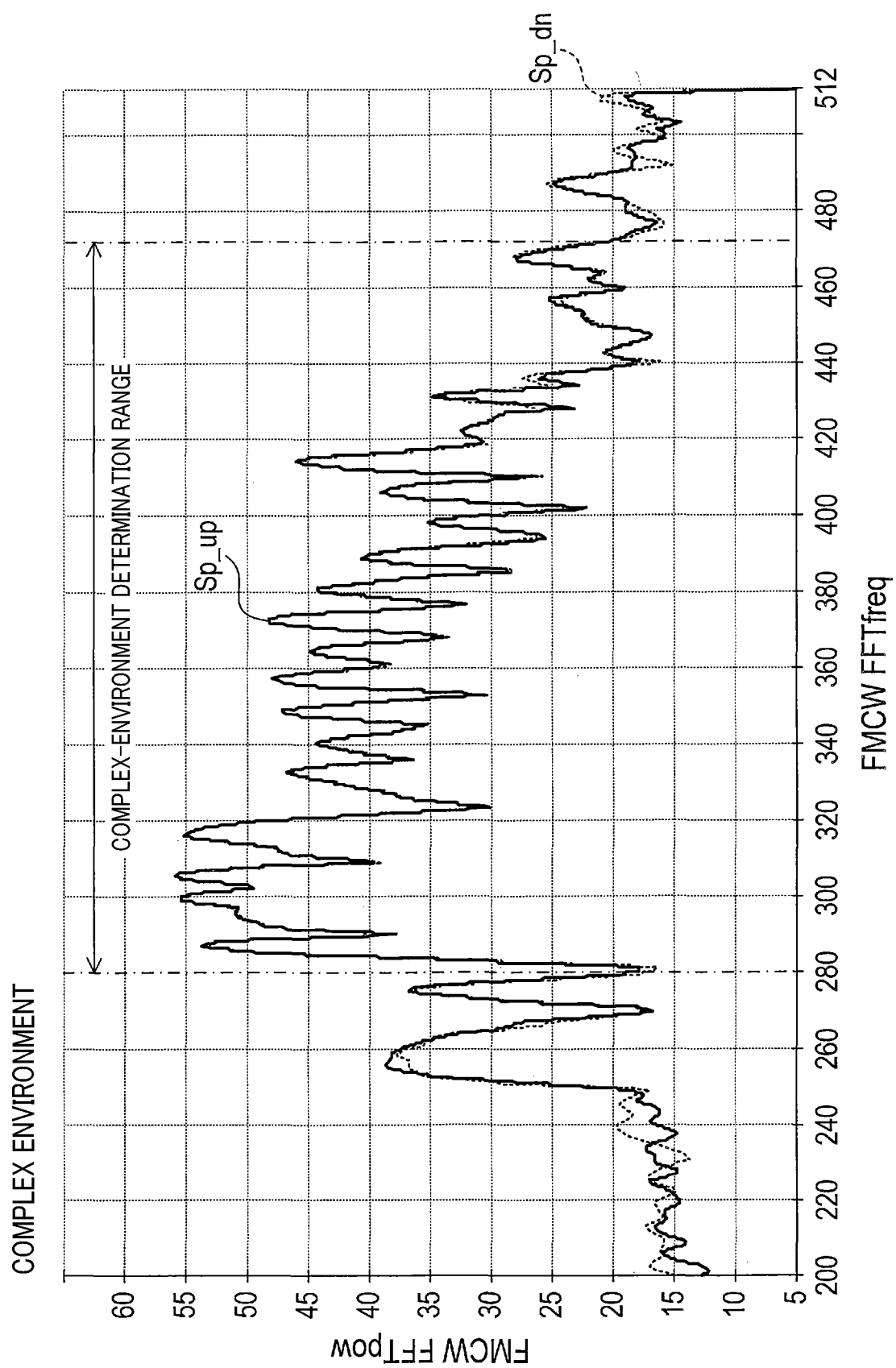
FIG. 7 is a diagram showing the waveform of a frequency spectrum generated by the FMCW method in a complex environment.

The complex-environment determination range is a predetermined range of the frequency spectrum as shown in FIGS. 6 and 7. The complex-environment determination range is preset according to the range of the distance R of the object to be monitored. That is, the range within which the object to be monitored exists is the complex-environment determination range. Similarly, in the case of the 2FCW method, when at least one of the conditions (A) and (B) is satisfied, it is determined that the surrounding environment of the vehicle VH is a complex environment. In addition, in the case of the 2FCW method, the complex-environment determination range is preset according to the range of the relative velocity Vr of the object to be monitored.

Furthermore, in the case of the FMCW method, adding the following condition (C), it is possible to determine, when at least one of the conditions (A), (B) and (C) is satisfied, that the surrounding environment of the vehicle VH is a complex environment. The condition (C): in the complex-environment determination range, the average electric power of the frequency spectrum Sp_up or the frequency spectrum Sp_dn is higher than a preset average-value threshold.

Similarly, in the case of the 2FCW method, it is also possible to determine, when at least one of the conditions (A), (B) and (C) is satisfied, that the surrounding environment of the vehicle VH is a complex environment. In addition, in the case of the 2FCW method, the average electric power of the frequency spectrum Sp_cw may be compared with the average-value threshold.

Next, in step S160, the moving object detection apparatus 4 makes the interference determination. The process of step S160 may be performed either in parallel with the processes of steps S130-S150, or in series with these processes after the process of step S120 until the process of step S170.

Figure 8A:
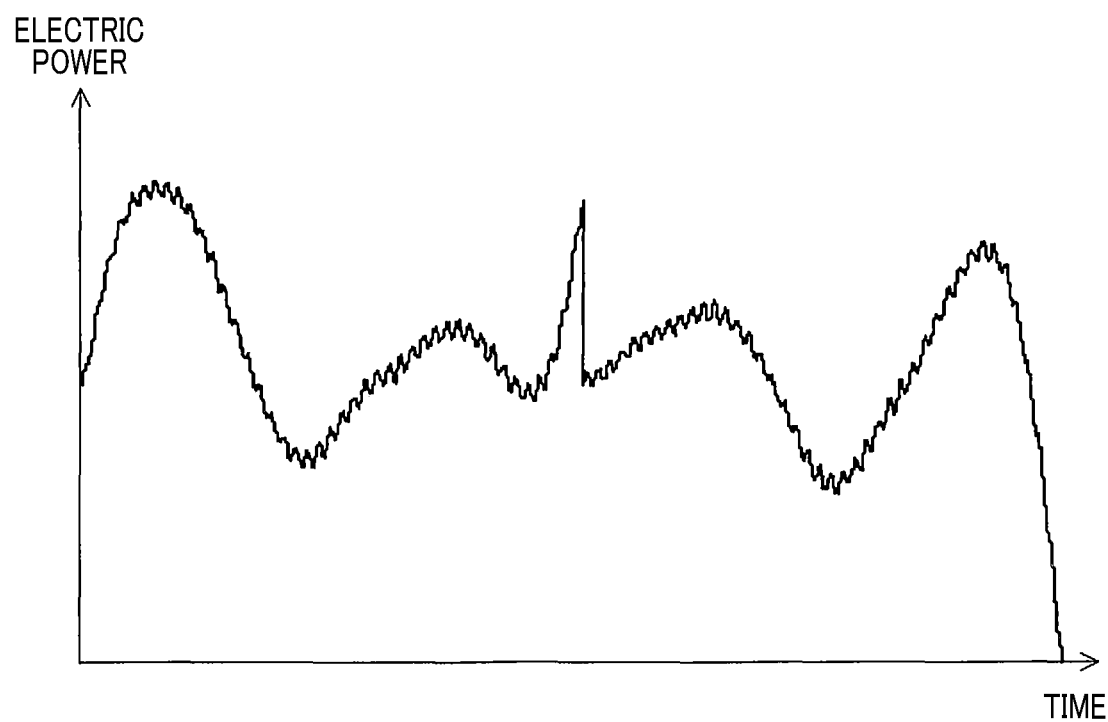
FIG. 8A is a diagram showing an AD waveform generated by the FMCW method in an environment where no interference occurs.
Figure 8B:
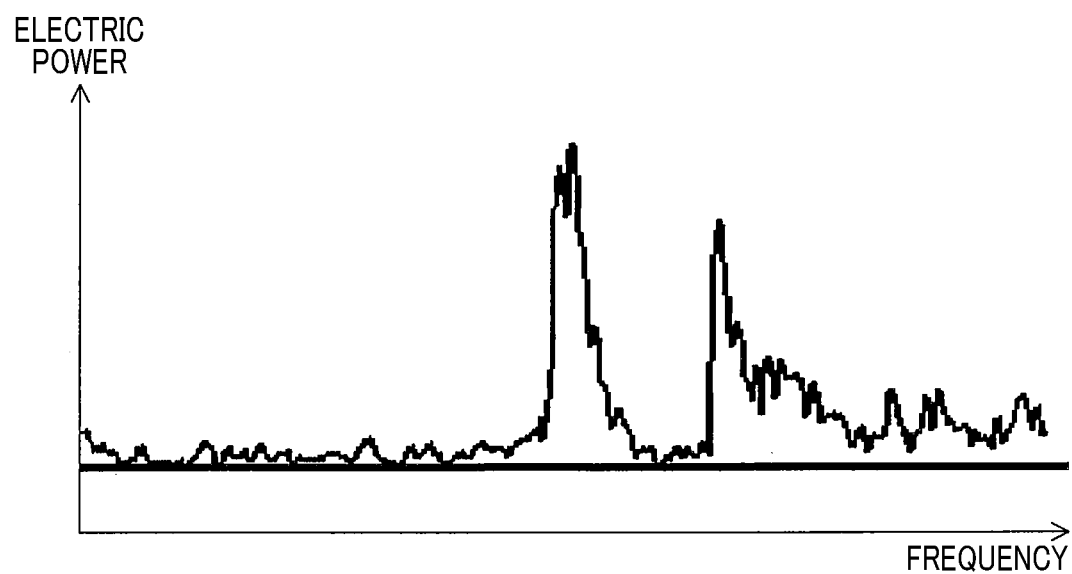
FIG. 8B is a diagram showing an FFT waveform generated by the FMCW method in the environment where no interference occurs.
Figure 9A:
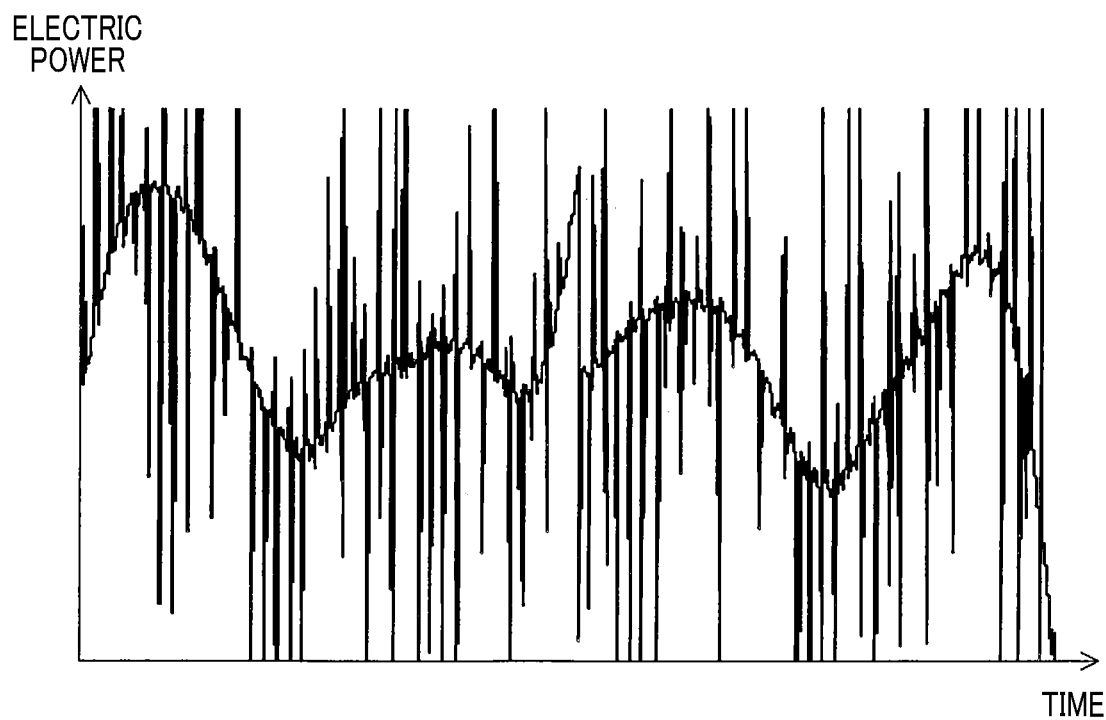
FIG. 9A is a diagram showing an AD waveform generated by the FMCW method in an environment where interference occurs.
Figure 9B:
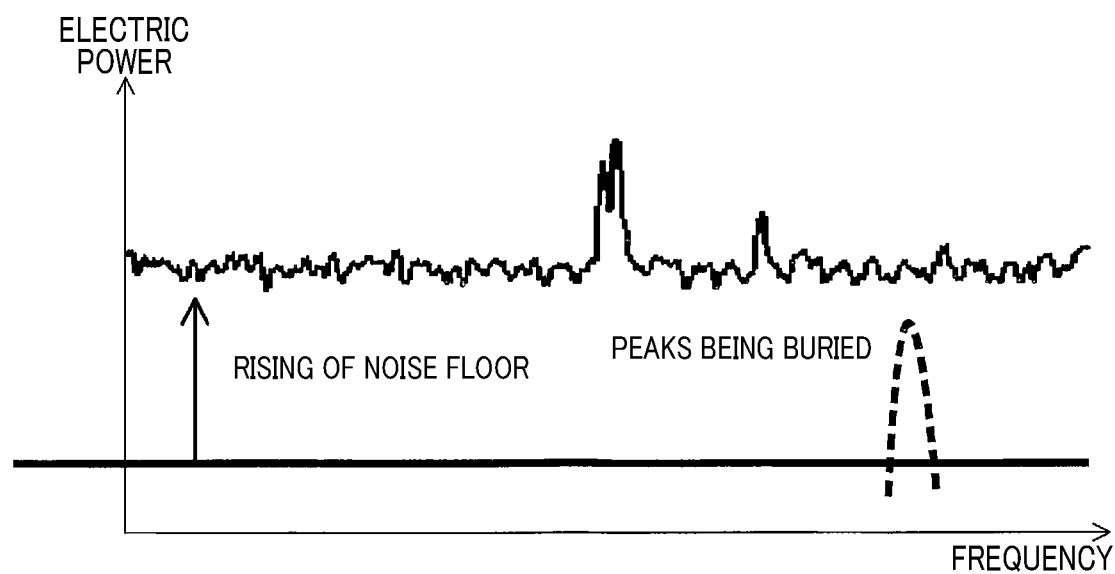
FIG. 9B is a diagram showing an FFT waveform generated by the FMCW method in the environment where interference occurs.

In the interference determination, if the noise floor has risen, it is determined that interference has occurred and thus the detection accuracy is low. FIGS. 8A and 8B illustrate a state where no interference occurs. FIG. 8A shows an AD waveform, and FIG. 8B shows an FFT waveform. FIGS. 9A and 9B illustrate a state where interference occurs. FIG. 9A shows an AD waveform, and FIG. 9B shows an FFT waveform.

As shown in FIGS. 8A and 8B, when no interference occurs, the AD waveform is obtained according to the position of the object; and thus the noise floor becomes low in the FFT waveform. In addition, the noise floor represents the average electric power over the entire range observable by each radar apparatus 2.

In contrast, as shown in FIGS. 9A and 9B, when radar-wave interference occurs due to radar waves transmitted from radar apparatuses of other vehicles, the AD waveform is obtained which has a number of peaks at positions irrelevant to the position of the object; thus the noise floor becomes high in the FFT waveform.

Using the above characteristics, in the case of the FMCW method, if the average electric power of the frequency spectrum Sp_up or the frequency spectrum Sp_dn over the entire range observable by each radar apparatus 2 is higher than the preset average-value threshold, the moving object detection apparatus 4 determines that interference has occurred. Similarly, in the case of the 2FCW method, if the average electric power of the frequency spectrum Sp_cw over the entire range observable by each radar apparatus 2 is higher than the preset average-value threshold, the moving object detection apparatus 4 determines that interference has occurred.

Next, in step S170, the moving object detection apparatus 4 determines weighting using the detection-accuracy estimation results. Then, in step S180, the moving object detection apparatus 4 calculates the object position. The weighting denotes a process of setting coefficients used to calculate a weighted average of the object information obtained for each of the radar apparatuses 2 and for each of the modulation methods; the coefficients are set for each of the radar apparatuses 2 and for each of the modulation methods. In addition, when no object exists in the overlap region between the object detection regions Rrl and Rrr of the left and right radar apparatuses 2, the weighting for the multipath-propagation determination and the weighting for the interference determination may be omitted.

First, in step S170, the moving object detection apparatus 4 sets weights so as to use the detection results of the object position depending on the presence or absence of multipath propagation, as shown in FIG. 10. Specifically, if both the left and right radar apparatuses 2 are in a normal state where no multipath-propagation occurs or if multipath propagation has occurred in both the left and right radar apparatuses 2, the moving object detection apparatus 4 sets the weights so as to use the average value of the object positions detected respectively by the left and right radar apparatuses 2. That is, the weights are set to the same value other than 0, such as 1, for both the left and right radar apparatuses 2. In addition, the weights are the coefficients by which the detection values of the radar apparatuses 2 are to be multiplied.

Otherwise, if one of the left and right radar apparatuses 2 is in the normal state while multipath propagation has occurred in the other of the left and right radar apparatuses 2, a left-right weighted average is used. As shown in FIG. 11, the weighted average is set such that: the weights are set to 1 when the S/N ratios are not lowered, and set to 0 when the noise is so large that it is difficult to detect peaks of the electric power. Here, the expression "the noise is so large that it is difficult to detect peaks of the electric power" denotes a state where peaks of the electric power detected by the radar apparatuses 2 are lower than or equal to the electric power (hereinafter, to be referred to as the set value) that is set to be higher by a specified value a than the noise equal to the average value of the electric power. In this state, the peaks of the electric power are buried in the noise so that it is difficult to identify the positions of the peaks.

When the noise is not so large that it is difficult to detect the peaks of the electric power, i.e., when the noise is so small that it is possible to sufficiently detect the peaks of the electric power, the weights are set according to the S/N ratios of the peaks of the electric power. In other words, the weights are set according to the ratios of the peaks of the electric power to the average value of the electric power. More particularly, the weights are set so as to approach 0 with decrease in the S/N ratios of the peaks of the electric power. In addition, the above weight setting is performed for each of the modulation methods.

Moreover, in step S170, the moving object detection apparatus 4 sets weights so as to use the detection results of the object position according to the results of the azimuth-accuracy checking. Specifically, as shown in FIG. 12, if the radar apparatuses 2 are in a normal state where the azimuth accuracy is deteriorated with neither of the modulation methods, the moving object detection apparatus 4 sets the weights so as to use the average value of the object positions detected respectively by the two modulation methods. That is, the weights are set to the same value other than 0, such as 1, for both the modulation methods.

Otherwise, if the azimuth accuracy is normal with one of the modulation methods while the azimuth accuracy is deteriorated with the other of the modulation methods, the moving object detection apparatus 4 sets the weights so as to use only the object position detected by the modulation method with which the azimuth accuracy is normal. For example, the weight for the modulation method with which the azimuth accuracy is normal is set to 1, while the weight for the modulation method with which the azimuth accuracy is deteriorated is set to 0.

Otherwise, if the azimuth accuracy is deteriorated with each of the modulation methods of the radar apparatuses 2, a weighted average is used for the two modulation methods. As shown in FIG. 13, the weighted average is set such that: the weights are set to 1 when the azimuth accuracy is not deteriorated, and set to 0 when the influence of roadside objects is large. Here, the expression "the influence of roadside objects is large" denotes, for example, a state where there exist a plurality of peaks in the electric power detected by the radar apparatuses 2 and the value of one of the peaks which represents a roadside object exceeds a set value that is set in advance. In addition, the set value used herein may be set to be different from the set value used for setting the weighting for multipath propagation. Moreover, it is possible to recognize whether the detected object is a moving object or a roadside object on the basis of the traveling speed of the vehicle, the relative speed of the detected object to the vehicle and the like.

When the influence of roadside objects is small, i.e., when the influence of roadside objects is not large, the weights are set according to the electric power at the peak representing a roadside object. More particularly, the weights are set so as to approach 0 with increase in the electric power at the peak representing a roadside object. In addition, the above weight setting is performed for each of the left and right radar apparatuses 2.

Moreover, in step S170, the moving object detection apparatus 4 sets weights so as to use the detection results of the object position according to the results of the interference determination. Specifically, as shown in FIG. 14, if both the left and right radar apparatuses 2 are in a normal state where no interference occurs or if interference has occurred in both the left and right radar apparatuses 2, the moving object detection apparatus 4 sets the weights so as to use the average value of the object positions detected respectively by the left and right radar apparatuses 2. In addition, the determination in this process is performed for each of the modulation methods.

Otherwise, if one of the left and right radar apparatuses 2 is in the normal state while interference has occurred in the other of the left and right radar apparatuses 2, a left-right weighted average is used. As shown in FIG. 15, the weighted average is set such that: the weights are set to 1 when no interference has occurred, and set to 0 when the noise floor is higher than a set value. Here, the set value is a value obtained by adding a predetermined value a to the default noise representing the magnitude of noise when no interference has occurred.

When the noise floor is not higher than the set value, i.e., when the noise floor is lower than or equal to the set value, the weights are set according to the magnitude of the noise floor. More particularly, the weights are set so as to approach 0 with increase in the noise floor. In addition, the above weight setting is performed for each of the modulation methods.

Next, in step S180, the moving object detection apparatus 4 calculates the object position. More particularly, the moving object detection apparatus 4 determines the position of the object by using in combination the output signals from the radar apparatuses 2 reflecting the set weighting.

In this process, first, the position of the object is determined using the weightings set respectively for the three processes for estimating the detection accuracies of the radar apparatuses 2.

Regarding the multipath-propagation determination, the moving object detection apparatus 4 determines the position of the object by the following Equation (1), where Pr (x, y) is the position of the object detected by the right radar apparatus 2R, Pl (x, y) is the position of the object detected by the left radar apparatus 2L, Wr is the weight set for the right radar apparatus 2R and Wl is the weight set for the left radar apparatus 2L.

$$P(x, y) = \frac{Wr}{(Wr + Wl)} * Pr(x, y) + \frac{Wl}{(Wr + Wl)} * Pl(x, y) \quad (1)$$

Regarding the azimuth-accuracy checking, the moving object detection apparatus 4 determines, in the same manner as in the case of the multipath-propagation determination, the position of the object by the above Equation (1). However, in this case, Pr (x, y) is the position of the object detected by the FMCW method, Pl (x, y) is the position of the object detected by the 2FCW method, Wr is the weight set for the FMCW method and Wl is the weight set for the 2FCW method.

Regarding the interference determination, the moving object detection apparatus 4 determines the position of the object also by the above Equation (1). In addition, in this case, Pr (x, y) is the position of the object detected by the right radar apparatus 2R, Pl (x, y) is the position of the object detected by the left radar apparatus 2L, Wr is the weight set for the right radar apparatus 2R and Wl is the weight set for the left radar apparatus 2L.

Next, the average value of the plurality of positions of the object, which are obtained respectively by using the weightings set for the multipath-propagation determination, the azimuth-accuracy checking and the interference determination, is calculated. Then, the average value is determined to be the position of the object.

Upon completion of the above processes, the object detection process is terminated.

[1-3. Advantageous Effects]

According to the above-described embodiment, the following advantageous effects can be achieved.

(1a) The moving object detection system 1 is mounted to a vehicle and configured to detect objects existing around the vehicle. The moving object detection apparatus 4 is configured to acquire, in steps S110 and S120, the output signals from the radar apparatuses 2 that are mounted respectively at different positions in the vehicle. Moreover, the moving object detection apparatus 4 is also configured to estimate, in steps S140, S150 and S160, the detection accuracies of the radar apparatuses 2 based on the output signals from the radar apparatuses 2.

The moving object detection apparatus 4 is also configured to set, in step S170, the weighting for the output signals from the radar apparatuses 2 according to the detection accuracies of the radar apparatuses 2. Moreover, the moving object detection apparatus 4 is also configured to calculate, in step S180, the position of an object by using in combination the output signals from the radar apparatuses 2 reflecting the set weighting.

With the above configuration, the output signals from the radar apparatuses 2, which are arranged respectively at different positions in the vehicle, are used in combination. Therefore, even when the detection accuracy of one of the radar apparatuses 2 is deteriorated, it is still possible to reliably detect the object if the detection accuracy of the other radar apparatus 2 is not deteriorated.

Moreover, even when the detection accuracies of the radar apparatuses 2 are all deteriorated, since the positions of the radar apparatuses 2 are different from each other, it is easy for a difference to be caused between the detection accuracies. Therefore, using in combination the output signals from the radar apparatuses 2 reflecting the weighting that is set according to the detection accuracies of the radar apparatuses 2, it is possible to detect the object with a greater weight given to the output signal from one of the radar apparatuses 2 which has higher detection accuracy than the other radar apparatus 2. Consequently, it becomes possible to suppress the influence of external factors such as radar waves transmitted from other vehicles; thus it becomes easier to detect the object than in the case of using only the output signals from a single radar apparatus 2.

(1b) The moving object detection apparatus 4 is configured to acquire, in steps S110 and S120, the output signals from the radar apparatuses 2, which use a plurality of modulation methods, for each of the modulation methods. Moreover, the moving object detection apparatus 4 is also configured to estimate, in steps S140, S150 and S160, the detection accuracies of the radar apparatuses 2 for each of the modulation methods. Furthermore, the moving object detection apparatus 4 is also configured to set, in step S170, the weighting for each of the modulation methods of the radar apparatuses 2.

With the above configuration, in the case of acquiring the output signals from the radar apparatuses 2 that use the plurality of modulation methods, the weighing is set for each of the modulation methods. Therefore, it is possible to optimally combine the output signals from the radar apparatuses 2 that use the plurality of modulation methods. Consequently, it becomes possible to make it easier to detect the object.

(1c) The moving object detection apparatus 4 is configured to estimate, in steps S140, S150 and S160, the detection accuracies of the radar apparatuses 2 by analyzing the frequency spectra of the output signals from the radar apparatuses 2.

With the above configuration, it is possible to identify, using the frequency spectra, situations such as a situation where there are many objects, such as other vehicles, around the vehicle and a situation where there are many types of noise such as interference of radar waves. Consequently, it becomes possible to reliably estimate the detection accuracies of the radar apparatuses 2.

(1d) The moving object detection apparatus 4 is configured to estimate, in steps S140, S150 and S160, the detection accuracies of the radar apparatuses 2 to be high when the numbers of peaks in the corresponding frequency spectra are less than the preset threshold number.

With the above configuration, it is possible to estimate the detection accuracies of the radar apparatuses 2 according to the numbers of peaks in the corresponding frequency spectra. Specifically, it is possible to estimate the detection accuracies of the radar apparatuses 2 to be high when the numbers of peaks in the corresponding frequency spectra are less than the threshold number and to be low when the numbers of peaks in the corresponding frequency spectra are greater than or equal to the threshold number.

(1e) The moving object detection apparatus 4 is configured to estimate, in steps S140, S150 and S160, the detection accuracies of the radar apparatuses 2 to be high when the average values of the electric power in the corresponding frequency spectra are lower than the preset average-value threshold.

With the above configuration, it is possible to estimate the detection accuracies of the radar apparatuses 2 according to the average values of the electric power in the corresponding frequency spectra. Specifically, it is possible to estimate the detection accuracies of the radar apparatuses 2 to be high when the average values of the electric power in the corresponding frequency spectra are lower than the average-value threshold and to be low when the average values of the electric power in the corresponding frequency spectra are higher than or equal to the average-value threshold.

(1f) The moving object detection apparatus 4 is configured to estimate, in steps S140, S150 and S160, the detection accuracies of the radar apparatuses 2 to be high when there are no parts of the corresponding frequency spectra where the S/N ratios are lower than the preset reference value.

With the above configuration, it is possible to: estimate, when there are no parts of the corresponding frequency spectra where the S/N ratios are lowered, that no multipath-propagation has occurred; and estimate, when no multipath-propagation has occurred, that the detection accuracies of the radar apparatuses 2 are high.

2. OTHER EMBODIMENTS

As above, one embodiment of the present disclosure has been described. However, the present disclosure is not limited to the above-described embodiment and can be carried out through various modifications.

(2a) In the above-described embodiment, as the process of determining the sole position of the object from a plurality of positions of the object, the average value of the plurality of positions of the object is used. However, the present disclosure is not limited to this configuration. For example, a weighted average, a least-squares method, a standard deviation or the like may alternatively be used as the process of determining the sole position of the object from the plurality of positions of the object. Moreover, in the above-described embodiment, explanation is given of the configuration where there are employed the radar sensors 2L and 2R that use the plurality of modulation methods. However, a configuration may alternatively be used where there are employed a plurality of radar sensors that use only one modulation method. Furthermore, in estimating the accuracies of the radar sensors 2L and 2R, any well-known method may alternatively be used.

(2b) A plurality of functions realized by a single component in the above-described embodiment may alternatively be realized by a plurality of components. Moreover, one function realized by a single component in the above-described embodiment may alternatively be realized by a plurality of components. In contrast, a plurality of functions realized by a plurality of components in the above-described embodiment may alternatively be realized by a single component. Moreover, one function realized by a plurality of components in the above-described embodiment may alternatively be realized by a single component. Furthermore, part of the configuration of the above-described embodiment may be omitted. In addition, the configuration of the above-described embodiment may be partially added to or partially replaced with the configuration of any other embodiment.

(2c) In addition to the above-described moving object detection system 1, the present disclosure may also be embodied in various modes such as an apparatus (e.g., the moving object detection apparatus 4) that is a component of the moving object detection system 1, a program for enabling a computer to function as the moving object detection system 1, a non-transitory tangible storage medium (e.g., a semiconductor memory) having the program stored therein, and a method of detecting a moving object.

3. CORRESPONDENCE BETWEEN CONFIGURATION OF EMBODIMENT AND CONFIGURATION OF THE PRESENT DISCLOSURE

The moving object detection apparatus 4 of the above-described embodiment corresponds to an object detection apparatus of the present disclosure. Moreover, of the processes performed by the moving object detection apparatus 4 in the above-described embodiment, the processes of steps S110 and step S120 correspond to an output acquisition unit of the present disclosure; the processes of steps S140, S150 and S160 correspond to an accuracy estimation unit of the present disclosure; the process of step S170 corresponds to a weighting setting unit of the present disclosure; and the process of step S180 corresponds to a position calculation unit of the present disclosure.

What is claimed is:

1. An object detection apparatus configured to be mounted to a vehicle to detect objects existing around the vehicle, the object detection apparatus comprising:
   an output acquisition unit configured to acquire output signals from a plurality of radar sensors mounted respectively at different positions in the vehicle;
   an accuracy estimation unit configured to estimate, based on the output signals from the plurality of radar sensors, detection accuracies of the plurality of radar sensors;
   a weighting setting unit configured to set, according to the detection accuracies of the plurality of radar sensors, weighting for the output signals from the plurality of radar sensors; and
   a position calculation unit configured to calculate a position of an object by using in combination the output signals from the plurality of radar sensors taking into the set weighting,
   wherein
   the output acquisition unit is configured to acquire the output signals from the plurality of radar sensors, which use a plurality of modulation methods, for each of the plurality of modulation methods, the accuracy estimation unit is configured to estimate the detection accuracies of the plurality of radar sensors for each of the plurality of modulation methods of the plurality of radar sensors, and the weighting setting unit is configured to set the weighting for each of the plurality of modulation methods of the plurality of radar sensors.

2. The object detection apparatus as set forth in claim 1, wherein the accuracy estimation unit is configured to estimate the detection accuracies of the plurality of radar sensors by analyzing frequency spectra of the output signals from the plurality of radar sensors.

3. The object detection apparatus as set forth in claim 2, wherein the accuracy estimation unit is configured to estimate the detection accuracies of the plurality of radar sensors to be higher when the numbers of peaks in the corresponding frequency spectra are less than a preset threshold than when the numbers of peaks in the corresponding frequency spectra are greater than or equal to the preset threshold.

4. The object detection apparatus as set forth in claim 2, wherein the accuracy estimation unit is configured to estimate the detection accuracies of the plurality of radar sensors to be higher when average values of electric power in the corresponding frequency spectra are lower than a preset threshold than when the average values of electric power in the corresponding frequency spectra are greater than or equal to the preset threshold.

5. The object detection apparatus as set forth in claim 2, wherein the accuracy estimation unit is configured to estimate the detection accuracies of the plurality of radar sensors to be higher when there are no parts of the corresponding frequency spectra where S/N ratios are lower than a preset reference value than when there are no parts of the corresponding frequency spectra where S/N ratios are greater than or equal to the preset reference value.

6. A method for detecting objects existing around a vehicle, the method comprising:

acquiring output signals from a plurality of radar sensors mounted respectively at different positions in the vehicle;

estimating, based on the output signals from the plurality of radar sensors, detection accuracies of the plurality of radar sensors;

setting, according to the detection accuracies of the plurality of radar sensors, weighting for the output signals from the plurality of radar sensors; and calculating a position of an object by using in combination the output signals from the plurality of radar sensors taking into the set weighting, wherein the output signals from the plurality of radar sensors, which use a plurality of modulation methods, are acquired for each of the plurality of modulation methods, the detection accuracies of the plurality of radar sensors are estimated for each of the plurality of modulation methods of the plurality of radar sensors, and the weighting is set for each of the plurality of modulation methods of the plurality of radar sensors.

7. The method as set forth in claim 6, wherein the detection accuracies of the plurality of radar sensors are estimated by analyzing frequency spectra of the output signals from the plurality of radar sensors.

8. The method as set forth in claim 7, wherein the detection accuracies of the plurality of radar sensors are estimated to be higher when the numbers of peaks in the corresponding frequency spectra are less than a preset threshold than when the numbers of peaks in the corresponding frequency spectra are greater than or equal to the preset threshold.

9. The method as set forth in claim 7, wherein the detection accuracies of the plurality of radar sensors are estimated to be higher when average values of electric power in the corresponding frequency spectra are lower than a preset threshold than when the average values of electric power in the corresponding frequency spectra are greater than or equal to the preset threshold.

10. The method as set forth in claim 7, wherein the detection accuracies of the plurality of radar sensors are estimated to be higher when there are no parts of the corresponding frequency spectra where S/N ratios are lower than a preset reference value than when there are no parts of the corresponding frequency spectra where S/N ratios are greater than or equal to the preset reference value.

11. A system for detecting objects existing around a vehicle, the system comprising:

a processor;

a non-transitory computer-readable storage medium; and a set of computer-executable instructions stored on the non-transitory computer-readable storage medium that cause the processor to:

acquire output signals from a plurality of radar sensors mounted respectively at different positions in the vehicle;

estimate, based on the output signals from the plurality of radar sensors, detection accuracies of the plurality of radar sensors;

set, according to the detection accuracies of the plurality of radar sensors, weighting for the output signals from the plurality of radar sensors; and calculate a position of an object by using in combination the output signals from the plurality of radar sensors taking into the set weighting, wherein the output signals from the plurality of radar sensors, which use a plurality of modulation methods, are acquired for each of the plurality of modulation methods, the detection accuracies of the plurality of radar sensors are estimated for each of the plurality of modulation methods of the plurality of radar sensors, and the weighting is set for each of the plurality of modulation methods of the plurality of radar sensors.

12. The system as set forth in claim 11, wherein the detection accuracies of the plurality of radar sensors are estimated by analyzing frequency spectra of the output signals from the plurality of radar sensors.

13. The system as set forth in claim 12, wherein the detection accuracies of the plurality of radar sensors are estimated to be higher when the numbers of peaks in the corresponding frequency spectra are less than a preset threshold than when the numbers of peaks in the corresponding frequency spectra are greater than or equal to the preset threshold.

14. The system as set forth in claim 12, wherein the detection accuracies of the plurality of radar sensors are estimated to be higher when average values of electric power in the corresponding frequency spectra are lower than a preset threshold than when the average values of electric power in the corresponding frequency spectra are greater than or equal to the preset threshold.

15. The system as set forth in claim 12, wherein the detection accuracies of the plurality of radar sensors are estimated to be higher when there are no parts of the corresponding frequency spectra where S/N ratios are lower than a preset reference value than when there are no parts of the corresponding frequency spectra where S/N ratios are greater than or equal to the preset reference value.

\* \* \* \* \*